United States Patent
Stevens et al.

(10) Patent No.: US 7,457,464 B2
(45) Date of Patent: *Nov. 25, 2008

(54) RENDERING OF SUBSTITUTE FOR DETECTED INDICIA

(75) Inventors: Chad A. Stevens, Boise, ID (US); Robert Sesek, Meridian, ID (US); Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1037 days.

This patent is subject to a terminal disclaimer.

(21) Appl. No.: 10/652,006

(22) Filed: Aug. 29, 2003

(65) Prior Publication Data

US 2005/0047682 A1   Mar. 3, 2005

(51) Int. Cl.
  *G06K 9/00*   (2006.01)

(52) U.S. Cl. .......... 382/181; 382/229; 358/1.9; 358/400; 358/453; 358/462

(58) Field of Classification Search ........... 382/181, 382/306, 229; 235/462.01–462.15, 375, 235/494; 380/46, 240, 258, 236; 709/206, 709/245; 361/93.1, 680, 642; 358/403, 404, 358/444, 1.9, 400, 453, 462
See application file for complete search history.

(56) References Cited

U.S. PATENT DOCUMENTS 7,221,800 B2 *  5/2007  Sesek et al. ............ 382/229

* cited by examiner

*Primary Examiner*—Sheela C Chawan

(57) ABSTRACT

A digital image is composed at a digital transmitter device from a hardcopy source. The digital image includes an optically scanned image. Indicia is detected on the hardcopy image. A substitute is made for the indicia in the composed digital image. A modified rendering of the digital image is output.

47 Claims, 7 Drawing Sheets

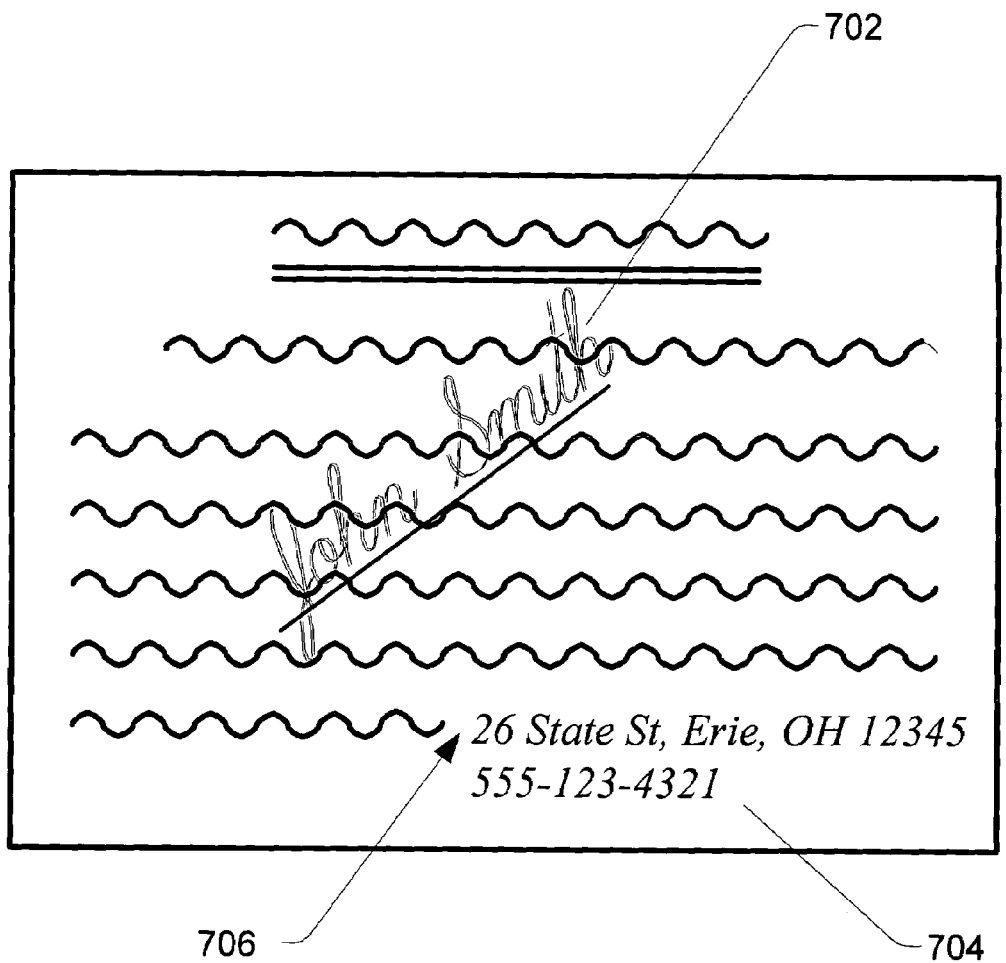

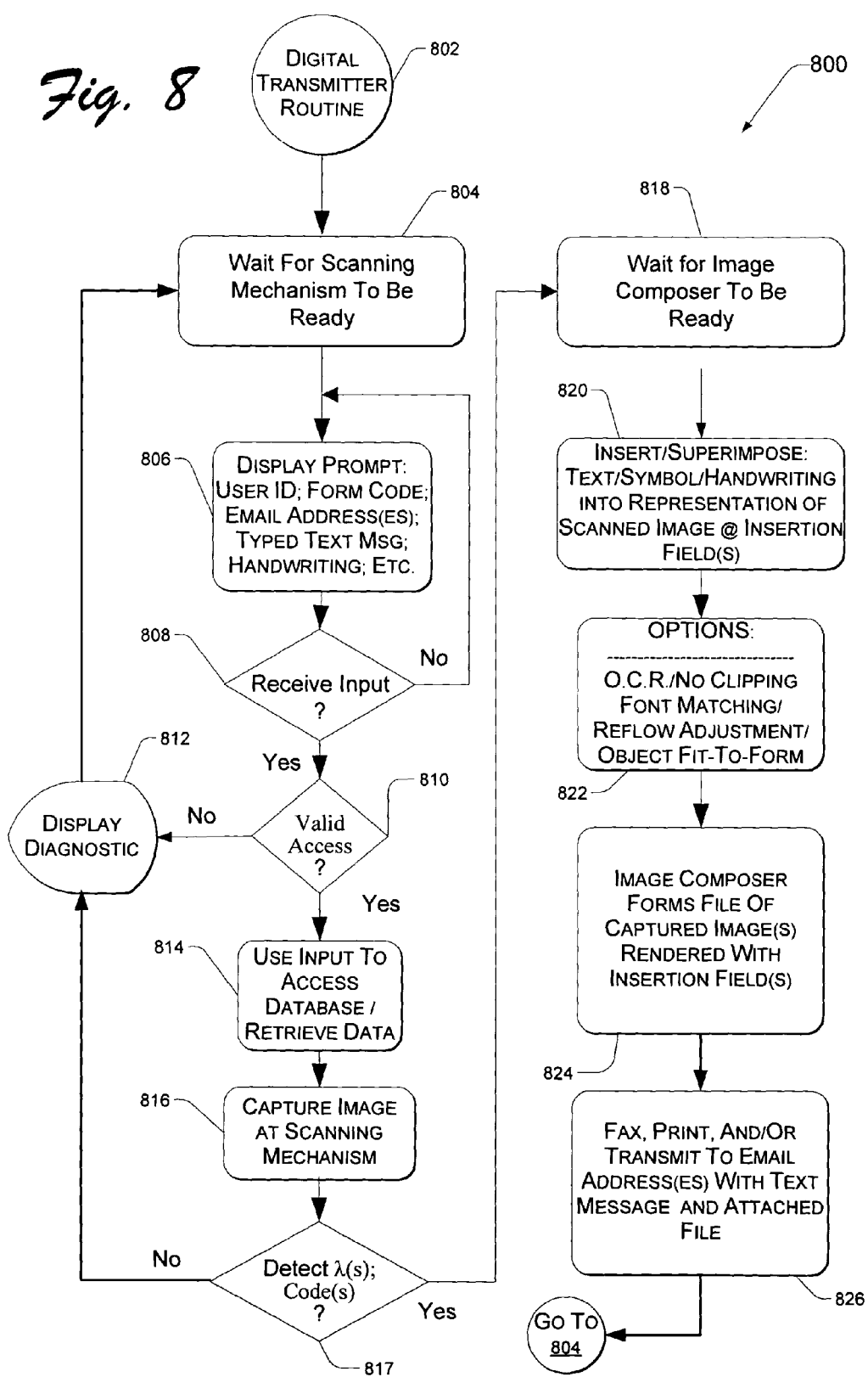

RENDERING OF SUBSTITUTE FOR DETECTED INDICIA

FIELD OF THE INVENTION

The present invention relates generally to peripheral devices, and more particularly to a digital transmitter device for digitally collecting and distributing a substitute for indicia detected in a document.

BACKGROUND OF THE INVENTION

Many peripherals to computer networks include a scanner component. One example of such a peripheral is an "All-in-one", also known as a multifunction peripheral (MFP) in that it has the capability to perform the multiple functions of scanning hardcopy documents, copying, and printing. Another example is a digital network copier that scans in documents from an automatic document feeder, does high volume copying, and has the capabilities of binding, collating, folding, stacking, stapling, stitching, edge-trimming, paginating, and printing on substrates of varied composition. Each of these peripherals, when in communication with an interconnecting network, can also be described as being a digital transmitter device. A digital transmitter device typically has an input device (e.g. a keyboard), a display, a scanner, and an output device. The output device of the digital transmitter device can be for sending a facsimile or an electronic mail message (e-mail). A digital transmitter device need not have a printer.

In an exemplary scanning operation, a hardcopy of a document or other physical object can be presented to the scanner portion of a digital transmitter device. After scanning, the digital transmitter device transforms the scanned image into a digital representation. If the digital transmitter device has a printer, the digital representation can be rendered to the printer to produce one or more hardcopies. If the digital transmitter device has facsimile transmission capabilities and a network over which to transmit a facsimile, the digital transmitter device can render the digital representation of the scanned image into a facsimile image that can be transmitted over the network to a predetermined or input facsimile telephone number.

In an exemplary digital transmitting operation, a hardcopy of a document or other physical object can be presented to the scanner portion of a digital transmitter device. After scanning, the digital transmitter device transforms the scanned image into a digital representation that is then saved in a data format, such as in a bit map data format or in a Portable Document Format (PDF). Electronic messaging can be used to send an electronic mail (e-mail) message from the digital transmitter device with an attachment of the digitized representation in the data format. The e-mail message can be sent to recipients over an interconnecting network, where the recipients have an e-mail address that a user manually enters at the digital transmitter device or that a user specifies using a predefined list of recipient e-mail addresses that can be stored in a memory of the digital transmitter device.

A hardcopy of a document that is to be scanned may need to be modified so that the resultant scanned document will contain the modifications. For instance, a user may wish to add a text message or a symbol to the hardcopy of the document. To do so, a softcopy of the document is edited using a document processing application. Then, a hardcopy of the edited document is output for scanning. There is a need for a scanner-based device, such as a digital transmitter device, with the flexibility to allow a user to modify a document at the scanner-based device without having to edit a softcopy of the document on another computing device.

SUMMARY OF THE INVENTION

A digital transmitter device composes a digital image from an optically scanned image, detects predetermined indicia in the digital image, substitutes an object for the detected predetermined indicia, and renders the new digital image including the substituted object.

DESCRIPTION OF THE DRAWINGS

A more complete understanding of the various implementations of the present invention may be had by reference to the following detailed description when taken in conjunction with the accompanying drawings wherein the same reference numbers are used throughout the drawings to reference like components and features, and wherein:

FIG. 1b is an example of a user interface, according to an embodiment of the present invention, for a digital transmitter device in FIG. 1a.

FIG. 7 is a representation of the paper document of FIG. 5 after it has been composed by the digital transmitter device, where one of the fields of detectable indicia has been substituted for a fitted field that includes a manually input signature that is superimposed as a watermark on the paper document, where the other field has address and telephone number data fitted therein and situated so as to avoid clipping an adjacent marking on the paper document, and where the contents of these two (2) fields were directly or indirectly obtained from the user input as shown in FIG. 6, according to an embodiment of the present invention.

FIG. 8 is a flow diagram depicting a process for use in a computing and communication environment having a digital transmitter device as in FIG. 1a, for example, in accordance with an exemplary embodiment of the present invention.

DETAILED DESCRIPTION

Figure 1A:
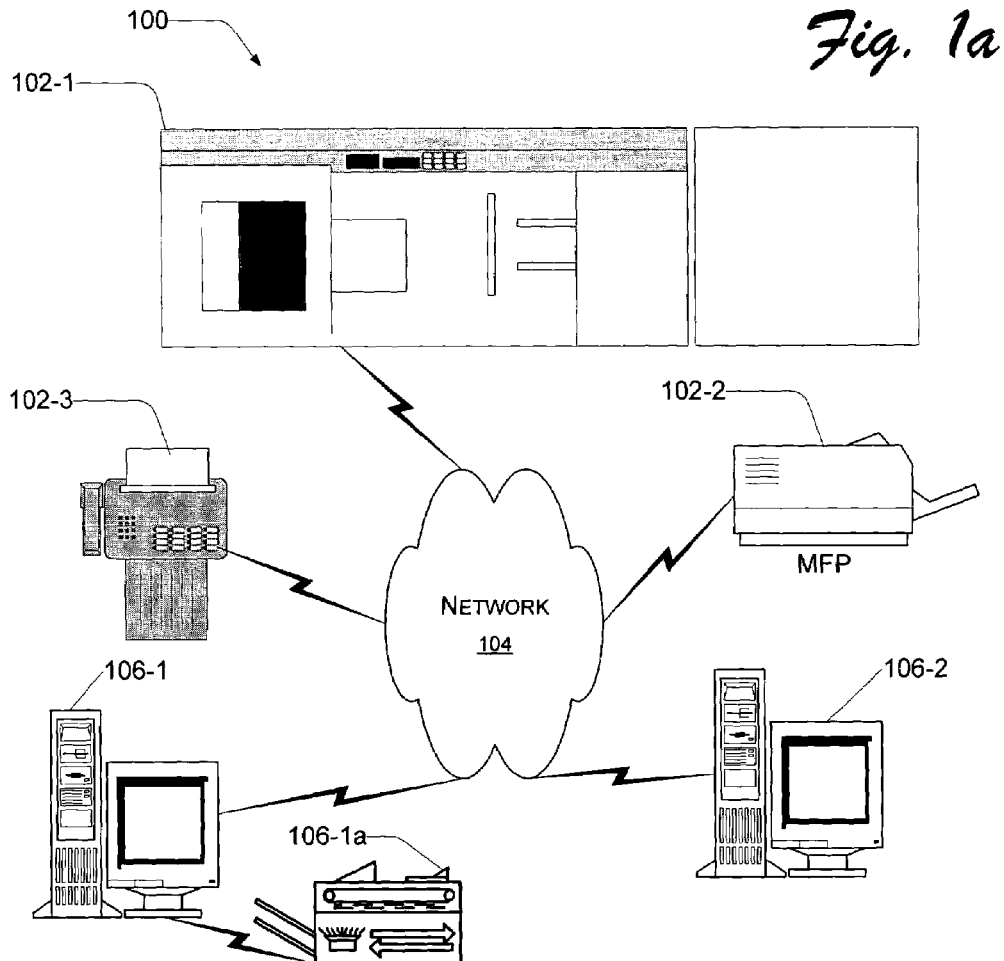
FIG. 1a is a block diagram, according to an embodiment of the present invention, depicting a computing and communication environment having various digital transmitter devices in a system environment suitable for providing local access to the digital transmitter devices.

Ideas in this patent make it easy to insert text and objects into a document with a digital transmitter device—without editing the document with a word processor. In one implementation, the document is marked up with detectable indicia where the text and objects are to be inserted. The marked up document is scanned and the detectable indicia is located in the optically scanned image. The text and objects are retrieved, such as by user input to the digital transmitter device, for instance, the user physically entering data from a keypad and/or touch screen. The retrieved text and objects are inserted at the locations at which the detectable indicia has been found in the optically scanned image to thereby produce a modified optically scanned image of the document. The modified optically scanned image can be printed, transmitted to one or more facsimile telephone numbers, transmitted to one or more an electronic mail (e-mail) addresses, and/or transmitted to one or more storage mediums (i.e., network share drives, RAM memory, etc.).

Implementations described herein relate to the scanning of a hardcopy to produce an optically scanned image at a digital transmitter device. The hardcopy has certain detectable indicia on its face. This detectable indicia is representative of one or more insertion fields into which text or an object is to be inserted. Scanning the hardcopy produces an optically scanned image. The optically scanned image is examined for the presence of the detectable indicia corresponding to one or more insertion fields. Detectable indicia determined to be present is further examined to determine the position, size, and shape of each of the one or more insertion fields. Upon this determination, respective text and/or objects are fit into each of the one or more insertion fields to produce a modified scanned image. The text and/or objects are located, identified, and/or retrieved using routines that call for interactive user input and/or retrieval of data from a database based upon interactive user input, such as where the user physically inputs data from a keypad and/or touch screen.

The detectable indicia can be quite diverse in type and kind. The type and kind of detectable indicia need only be detectable by a detection routine that is performed upon an optically scanned image. As such, the detectable indicia can be an ink that is visible upon application by a user to a paper document but becomes invisible to the human eye when the ink dries. Nevertheless, the dry ink is still detectable by the detection routine that is performed upon the optically scanned image. Invisible ink may be selected as the desirable detectable indicia in that the original paper document is not obscured by a user's markings. The dry ink, when invisible to the human eye, can be detected when it exhibits a predetermined range of reflectance values or exhibits an inherent reflectivity property (e.g., one or more wavelengths, $\lambda$) that can be found by the detection routine performed upon the optically scanned image. The reflective property of the ink can be understood as a particular hue or color that is found within the optically scanned image by the detection routine. The dry ink, in another example, may only be visible to the human eye when illuminated by a certain color of light, such as a blue-violet light. As such, the dry ink would only be detectable when illuminated by light of one or more predetermined ranges of wavelengths.

Alternatively, the detectable indicia can be a bar code or other patterned indicia that can be detected within the optically scanned image by the detection routine. Other detectable indicia are also contemplated, any of which can be found by known detection routines performed upon an optically scanned image.

As described above, the detectable indicia is representative of one or more insertion fields into which text or an object is to be inserted. The detection routine, once having determined the presence of detectable indicia in the optically scanned image, will use the detected presence to determine various characteristics, respectively, of the one or more insertion fields. These characteristics can include the number, location, size, and shape of the one or more insertions fields. For example, a user can apply sticky bar code labels of different types to a piece of paper that is to be scanned. Alternatively, the user can also edit a softcopy of the document so as to include images of the bar codes or like detectable indicia.

The types of bar codes placed on the hardcopy, or its corresponding softcopy, by the user can have respectively different significance in subsequent processing. A particular bar code that is detected by a detection routine may be interpreted as an instruction to prompt a user to input a code at a user interface of the digital transmitter device. For instance, the prompt may direct the user to physically input data from a keypad and/or touch screen. This input code would then be used to look up text and/or one or more objects that are to be fit as a substitution for the detectable indicia into the corresponding insertion field. The input code may also be used to ascertain a predetermined shape and size of the insertion field. Alternatively, the input code might be used to retrieve a particular e-mail address distribution list from a particular database so that an e-mail message can be addressed to each of the e-mail addresses along with an attached file containing the optically scanned image as modified by the inserted text and objects. A different bar code that is detected by a detection routine may be interpreted as an instruction to prompt a user to make a handwritten mark using a stylus on a touch sensitive menu screen of a user interface with the digital transmitter device. The handwritten mark can be processed in a variety of ways, include the fitting of the same into an insertion field of predetermined size at the location of the bar code in the optically scanned image. The optically scanned image is modified so as to show the handwritten mark, such as by obscuring the document beneath the handwritten mark, or by watermarking the handwritten mark so that it does not obscure the document beneath the handwritten mark—depending upon which bar code the user applied to the hardcopy.

In addition to or as an alternative to bar codes, a user can make marks or symbols on the hardcopy that is to be scanned, such as with one or more types of non-human visible inks such as the invisible ink described above. For instance, each ink can exhibit different inherent reflectivity properties (e.g., a different wavelength—$\lambda$), each having a significance similar to that of the different bar codes.

The different bar codes and markings, as described above, can represent different shapes and sizes of insertion fields. For instance, a user may use ink to mark a periphery of an insertion field, or the user can make a mark on the hardcopy for which the periphery of an insertion field is predetermined. For instance, the mark "x" may be an indicator for an insertion field having a shape that is any of: a circle having a one (1) inch radius, a two (2) inch square, an ellipse having two foci separated by one (1) inch, etc. Two dots made by a user on a paper document may interpreted by a detection routine as indicating, respectively, the upper left and lower right corners of a rectangular insertion field. The type, shape, and size of markings that correspond to insertion fields of various shapes, sizes, and positions are not limited by the examples given herein.

Upon detection of the detectable indicia corresponding to each insertion field and the shape, size, and position thereof, (e.g., invisible ink, bar code, or other significant mark), the detection routine can also determine what is to be inserted into each insertion field. For instance, the detection of ink having a specific reflective property may be recognized as a cue to prompt the user for input. After the user has responded with input to the prompt, the optically scanned image would then be modified to fit the user's input into the size, shape and position of the insertion field so as to create a modified scanned image. The modified scanned image can then be rendered as a hardcopy upon which the user's input is seen. Other output renderings are also contemplated.

The user can mark one or more fields on the paper. The shapes of the marks made by the user, and the types of ink used by the user, can have respectively different significances in subsequent processing by various detection routines. A particular mark that is detected by a detection routine may be interpreted as an instruction to prompt a user to input a code at a user interface of the digital transmitter device, such as by using a keypad and/or touch sensitive menu screen. This input code can then be used to look up text and/or objects that are to be fit into an insertion field of predetermined size at the location of the particular mark. This or another input code might be used for the retrieval of a distribution list of e-mail addresses from a particular database so that respective e-mail messages can be addressed for the transmission thereto of the modified scanned image. A different mark that is detected by a detection routine may be interpreted as an instruction to prompt a user to make a handwritten mark using a stylus on a touch sensitive menu screen of a user interface. The handwritten mark can be processed in a variety of ways, as described herein.

The modified scanned image can be rendered as a hardcopy to a printer. One routine can request the user to input a code that is used to look up an e-mail address or a facsimile telephone number to which the modified scanned image is to be transmitted. The modified scanned image can then be transmitted by e-mail or by facsimile to a facsimile telephone number, or it can then be rendered as a hardcopy to a printer or any combination of the forgoing.

A network message can be transmitted so as to include the modified scanned image in a transmission of message data via an e-mail message from the digital transmitter device to one or more e-mail address(es). When an e-mail message is sent from a digital transmitter device, message data including the modified scanned image can be attached to the e-mail message.

The e-mail message is sent from the digital transmitter device to an electronic address including an address of a network resource and a destination location thereat. The modified scanned image in the message data can be composed from the digitized image that was captured by the scanning mechanism, which digital image was modified by any insertion fields as described above. The e-mail address (es) can be anyone of an electronic mail (e-mail) address at an e-mail server on a network, a file folder address at a server on a network, a Web site address at a server on a network, and the like.

The digitizing of the composition process for the message data can include handwriting, or other indicia, that was captured from a user's use of an input device, such as a touch sensitive menu screen, a keyboard, etc. One result of the composition or digitizing process is that the input from the input device (e.g., handwriting received at a touch sensitive menu screen) can be superimposed on, around, or near the image that has been composed or digitized. As such, the resultant appearance of the rendered documents sent in the e-mail message will be that the handwriting, or other indicia, appears to be integral to or a part of the original images on the documents that were captured by the scanning mechanism.

Exemplary System for Configuration of a Digital Transmitter Device

FIG. 1a illustrates an example of a system environment 100 suitable for implementing an embodiment of the present invention. The system environment 100 contemplates a plurality of digital transmitter devices 102-i (e.g., 102-1, 102-2, etc.) that can be in communication with an interconnected network 104. Interconnected network 104 is in communication with one or more server(s) 106-i. Each server 106-i can be an e-mail message server that serves one or more e-mail addresses to which any digital transmitter device 102 can send an e-mail message. Digital transmitter devices 102-i may be stand-alone devices that have a scanning mechanism, and may also have an output mechanism such as a printer, a copier or a fax machine. As such, each digital transmitter devices 102-i can be a multifunction peripheral (MFP) device that combines the scanning mechanism and the output mechanism into a single device. A digital transmitter device 102-i can function while uncoupled or isolated from other devices. A digital transmitter device 102-i therefore can be a device such as a copier, a scanner, or a fax machine such as are shown in FIG. 1a.

Figure 1B:
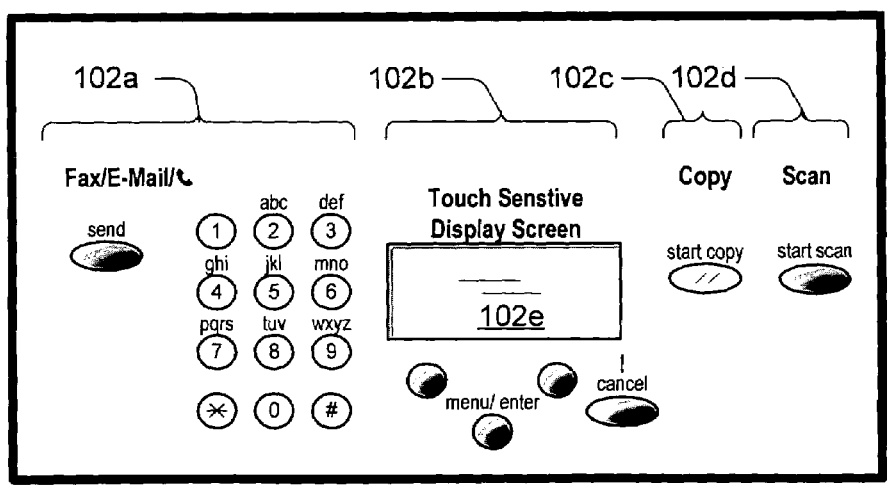

Digital transmitter devices 102-i are generally distinguishable from devices such as desktop PCs (personal computers), laptop PCs, and pocket PCs by their limited purpose and limited user interface or input/output capabilities. For example, FIG. 1b shows a user interface for a digital transmitter device 102-i. The user interface includes various sections of input devices to perform respective functions with the digital transmitter device. Section 102a allows input of alphanumeric strings with respective number keys in order perform input to send a facsimile and/or an e-mail. Section 102b shows a touch sensitive menu screen 102e for receiving input and/or outputting a display of diagnostics and/or status. Various menu buttons are also shown in Section 102b. Section 102c shows a copy start button to make a copy of one or more sheets of optically scanned paper. Section 102d shows a scan button to optically scan one or more pieces of paper. As an alternative to the user interface depicted in FIG. 1b, digital transmitter device 102-i can have a simpler front menu panel with a limited screen space and less input buttons or keys. As another alternative to the user interface depicted in FIG. 1b, digital transmitter device 102-i can have an integrated keyboard (such as a "QWERTY" keyboard) to assist in entering data.

A digital transmitter device 102-i is typically oriented toward performing one general task such as scanning and outputting that which was scanned. By contrast, devices such as desktop, laptop, and pocket PCs often provide multiple and varied means of input/output such as a full screen display, a keyboard, a mouse, speakers, microphones, PCMCIA (Personal Computer Memory Card International Association) slots, portable media drives and the like. These devices are capable of performing multiple functions through executing various software applications such as word processing applications, spreadsheet applications, financial applications, network browsers and network messaging applications.

Various digital transmitter devices 102-i are seen in FIG. 1a, including a facsimile machine 102-3, a multifunctional peripheral machine 102-2 with a printer device that can scan and print out a hardcopy or send an e-mail message with an attached copy of the scanned hardcopy, and a high volume copier 102-1 that includes the capabilities of printing on substrates of varied composition, binding, collating, folding, stacking, stapling, stitching, edge-trimming, and paginating.

Interconnecting network 104 is representative of one or more communication links, either wired or wireless, that are capable of carrying data between server(s) 106-i and other network resources in communication with interconnecting network 104. In certain exemplary implementations, interconnecting network 104 includes a local area network (LAN), a wide area network (WAN), an intranet, the Internet, or other similar network.

Local access to each digital transmitter device 102-i can be provided through an input device, such as a touch sensitive menu screen, on each digital transmitter device 102-i. A user accesses the input device via a user interface for the purpose of entering commands, a User ID, one or more e-mail addresses, and optional message text for an e-mail message that the user wishes to send. Alternatively, a default e-mail address or a list of selectable e-mail addresses can also be stored at each digital transmitter device 102-i. Each digital transmitter device 102-i has an imaging or scanning mechanism to receive images of an object (e.g., a hardcopy). A document composer component in each digital transmitter device 102-i then composes images of the scanned object, as discussed below. The detection of detectable indicia in the scanned hardcopy is followed by the insertion of various text and/or objects into respective insertion fields corresponding to the detectable indicia. After these insertions, a modified scanned image of the hardcopy is composed as a document. The composed documents can then be output by digital transmitter device 102-i. The composed documents can be output such as by being printed out, transmitted by a facsimile to a facsimile telephone number, or sent in a file attached to an e-mail message that is addressed to the input, default, or selected e-mail address(es) from digital transmitter device 102-i through interconnected network 104 to one or more e-mail servers 106-i for the respective e-mail address(es) input or specified by the user.

The user of digital transmitter device 102-i seen in FIG. 1a can transmit message data to interconnected network 104 by a wired or wireless link. A wireless link can be through an Infrared (IR) data connection or other wireless data connections such as the Blue Tooth or 802.11 protocol. The wireless link may be made through radio frequency (RF) or infra-red (IR) data ports. By way of example, digital transmitter device 102-i can include the capabilities of a cordless handset telephone, a cellular telephone, a personal digital assistant (PDA), a pager, a watch and the like, any of which is also capable of transmitting data in a wireless manner. A wired link can be performed through a USB data connection, a serial port connection, a parallel port connection or via other known data transmission standards and modes. The wired link may be implemented through standard category V cable, Universal Serial Bus (USB) cable, or IEEE 1394 (i.link/Lynx/Fire Wire™) connection data ports. As such, digital transmitter device 102-i can transmit by one or both of a wireless or wired link.

Figure 2:
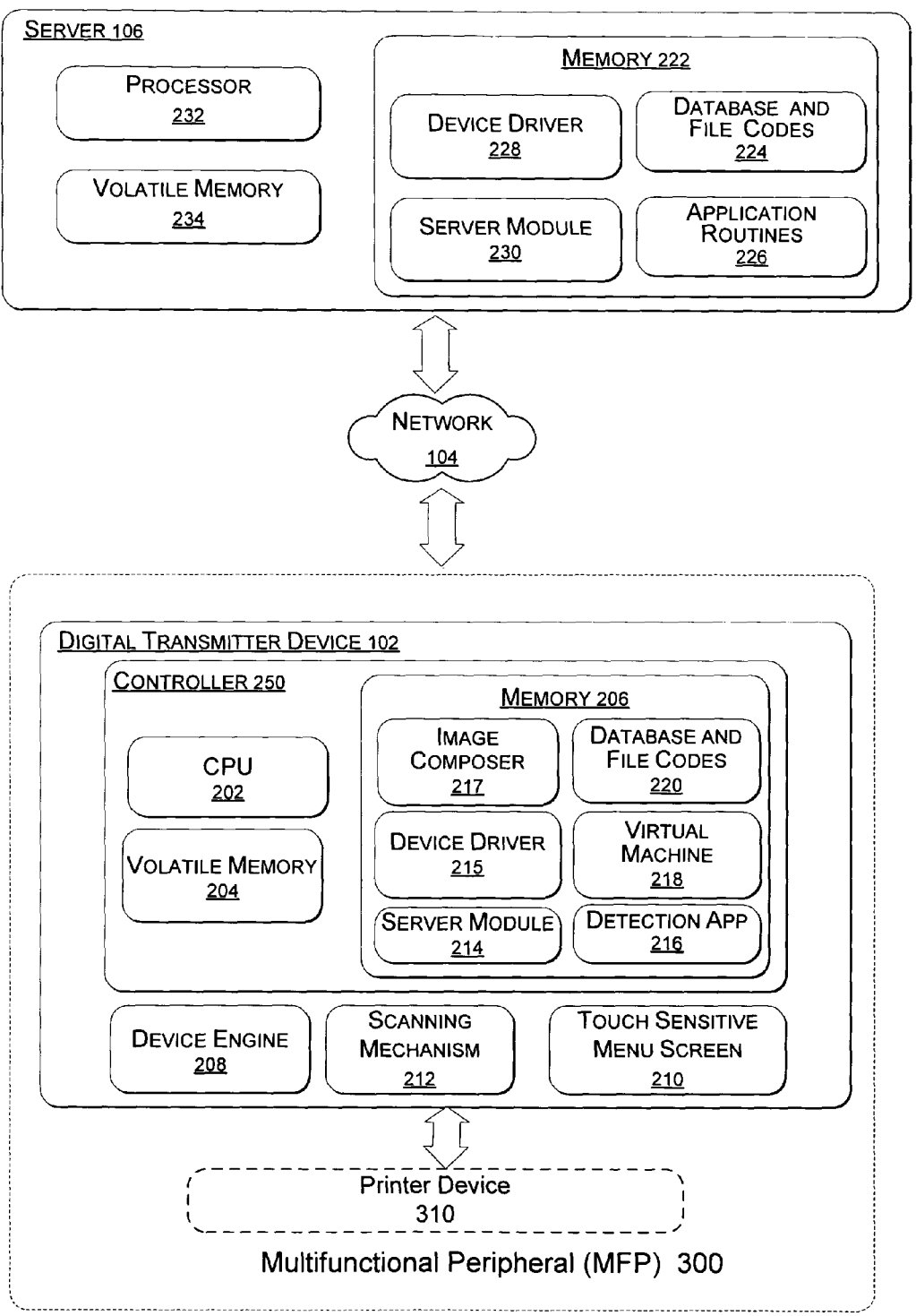
FIG. 2 is a block diagram, according to an embodiment of the present invention, illustrating a digital transmitter device in communication through a wired or wireless link to an interconnecting network to which a server is also in communication.

Exemplary System for a Digital Transmitting Device in Communication with a Server A system 200 of FIG. 2 includes digital transmitter device 102 as a network resource coupled by a wired or wireless link to interconnecting network 104 and to server 106 through interconnected network 104. As such, FIG. 2 illustrates an embodiment of the system 100 of FIG. 1a in greater detail. In accordance with still further aspects of the present invention, digital transmitter device 102 may be included within a multiple function peripheral (MFP) device 300. As its name implies, the MFP device 300 is configured to provide multiple functions. In this example, the functions provided by the MFP device 300 include those provided by digital transmitter device 102 as well as an optional printer device 310. Consequently, the user of digital transmitter device 102 may also print out a hardcopy of any applicable portions of data stored, scanned or otherwise acquired by digital transmitter device 102.

In general, digital transmitter device 102 uses a controller 250 to execute a program that can be stored in an image composer 217 of a memory 206. Execution of the image composer 217 will compose a document from images that are captured by scanning the document using a scanning mechanism 212. A detection application 216 in memory 206 can be used to detect detectable indicia in an optically scanned image, to determine the size, shape, and location of insertion fields from the detected indicia, and to determine a process for obtaining the text or objects to be inserted into each insertion field in the optically scanned image.

Input from a user, and/or the detected indicia, can be used as a key to look up corresponding text or objects in a database and file codes storage 220 in memory 206 of digital transmitter device 102 and/or in database and file codes storage 224 in memory 222 of server 106. Text or objects thus obtained can then be used for any of a variety of purposes. For instance, the input from the user can be a code that is looked upon the database and file codes storage 220 for the purpose of obtaining a single email address or an e-mail address list.

The detected indicia can be a bar code or invisible ink symbol that can be looked up in the database and file codes storage 220. This look up operation can obtain corresponding text and/or objects. These corresponding text and/or objects can then be substituted into the corresponding insertion fields in a scanned hardcopy so as to take the place of the detected indicia. Other look ups are also contemplated, such as particular patterns, where different patterns could indicate different types of insertions.

Upon obtaining the text and/or objects, the execution of the detection application 216 can also fit, insert, and/or superimpose each such text or object into, around, and/or proximal to the corresponding insertion field of the optically scanned image. The image composer 217 can be used to compose a modified optically scanned version of the document containing the inserted text and/or objects. This modified optically scanned version of the document can then be output or rendered. Alternatively, the modified optically scanned version of the document can be composed and stored, in full or in part, locally in and/or remotely to scanning mechanism 212.

Controller 250 can execute a program so as to transform data to a driver format suitable for printing with integral, optional printer device 310, such as a mark up language format (e.g. SMGL, HTML, or XML), or such as a job language format (e.g. PCL or POSTSCRIPT®. Printer device 310 can have the capability of converting data and then outputting it onto an appropriate print media, such as paper, transparencies or glossy photo paper.

Digital transmitter 102 includes one or more CPUs 202, each of which is operatively coupled to memory 206, and a user interface that includes an input device. Preferably, the input device will be locally accessible at digital transmitter device 102. By way of example, the input device can be a touch sensitive menu screen 210. Digital transmitter device 102 also includes at least one communication port for interfacing with interconnecting network 104 through either a wired or wireless link.

When included in MFP device 300, CPU(s) 202 would also be operatively coupled to printer device 310, for example. CPU(s) 202 is representative of any hardware, firmware and/or software that is configured to perform certain functions associated with the operation of digital transmitter device 102. Hence, as those skilled in the art will recognize, CPU(s) 202 may include dedicated logic and/or one or more processors configured in accord with software instructions, for example.

Memory 206 is representative of any type of data storage mechanism that can be accessed by at least CPU(s) 202. Memory 206 may therefore include, for example, some form of random access memory (RAM), some form of read only memory (ROM), and/or other like solid-state data storage mechanism. Memory 206 may include a magnetic and/or optical data storage mechanism. Scanning mechanism 212 is representative of any optical scanner technology that may be employed to produce scanned object data upon scanning an object. Such scanning technologies are well known. The resulting scanned object data is provided to CPU 202 and/or stored in memory 206.

Controller 250 of digital transmitter device 102 typically includes data processing unit or CPU 202, a volatile memory 204 (i.e., RAM), and a non-volatile memory 206 (e.g., ROM, Flash). Digital transmitter device 102 also includes a device engine 208. The touch sensitive menu screen 210 acts as a local user interface for digital transmitter device 102 by displaying menu pages and accepting user input based on selectable menu items displayed on the menu pages. The touch sensitive menu screen 210 can be used to display a menu page that asks for and receives the input, such as an e-mail address to which to image data that is scanned with scanning mechanism 212 is to be transmitted in an e-mail message via interconnected network 104.

Controller 250 processes data and manages device functions by controlling device engine 208 and by responding to input from touch sensitive menu screen 210. Device driver software in a device server can be stored in memory 206 and executed on CPU(s) 202. Memory 206 also includes a server module 214 configured to serve menu documents to the touch sensitive menu screen 210. The server module 214 is a local server in the sense that it is present within the same digital transmitter device 102 to which it serves menu documents.

Menu documents stored in memory 206 can be interpreted by the server module 214 and are configured to display textual and graphical information as menu pages on the touch sensitive menu screen 210. The menu documents driving the menu pages can include script code that is associated with graphical keys. The term "script code" is intended herein to mean any one of a variety of different code types. Various kinds of code are contemplated. By way of example, and not by way of limitation, the code can be implemented in embedded script code, in firmware, in a native code such as C++ code, or can be JAVA script. The code can be written in JavaScript code that is interpreted and executed on a Java Virtual Machine (JVM). The code can also be written in other script code languages such as VBScript or Perl.

Selecting a menu item by pressing a graphical key on the touch sensitive menu screen 210 triggers an event, which causes a "virtual machine" 218 to interpret and execute the script code associated with the selected graphical key. The virtual machine 218 is a software module stored in memory 206 that executes on CPU(s) 202 to interpret and execute script code. The script code can be associated with selectable menu items (i.e., graphical keys or buttons). One menu item is configured to initiate a scan of an image using the scanning mechanism 212. Another menu item can be configured to perform the task of receiving input that includes a User ID, a priority code, and one or more e-mail address(es) to which e-mail message data is to be sent via interconnected network 104. Still another menu item can be configured to perform the task of initiating a retrieval of an e-mail address that was previously stored in memory 206, where memory 206 can optionally contain e-mail address information in the database and file codes storage 220 in memory 206 that can be requested to be displayed upon touch sensitive menu screen 210. When the e-mail address information is retrieved from memory 206, the user can select a displayed e-mail address to which an e-mail message will be transmitted over interconnected network 104 to one or more recipients via server 106-i from the memory 206 of another digital transmitter device 102 as seen in FIG. 1a. Alternatively, the user can directly enter a specific e-mail address into the digital transmitter device 102 using touch sensitive menu screen 210. Controller 250 executes processes resident in a communicative link interface for a transmission (e.g. an e-mail message) that can be transmitted over a wired and/or wireless link to interconnected network 104. These transmitted email messages need not be sent to another digital transmission device 102-i, they may be sent to any device capable of receiving email.

Before or after a user has manually input data and/or a signature at touch sensitive menu screen 210, the user can enter a command to initiate a scanning operation. The user places a document into a sheet feeder device associated with digital transmitter device 102. The sheet feeder device then physically feeds each sheet in the document to scanning mechanism 212. Alternatively, the user can place a single sheet or substrate on to a glass platen associated with digital transmitter device 102. CPU(s) 202 process software or other machine executable code stored in image composer 217. The image composer 217 then generates a bit map or other output that is a digital representation of the scanned document in a document composition process. The bit map or other digital representation of the document is examined for the presence of detectable indicia and insertion fields corresponding thereto by execution of the detection application 216 and/or other routines. Text and/or object(s) for each insertion field are obtained as described herein.

Once obtained, the text and/or objects are inserted into their respective insertion fields within the bit map or other output that is a digital representation of the scanned documents. A modified scanned image is then composed by image composer 217. The modified scanned image that is composed includes all insertion fields having the corresponding text and objects inserted therein by way of substitution for the detectable indicia.

The text and/or objects can be inserted in their respective insertion fields in a variety of ways. For instance, an insertion field can be rendered in the modified scanned image to appear as a water mark, so that the one or more superimpositions do not substantially obscure any portion of the images on the rendered documents. The superimpositions can appear to be integral with the images on the rendered document so that their appearance thereon is easily noticed and could not be easily removed. To further minimize obscuring any portion of the images on the rendered documents, the superimpositions can be situated in a margin or scaled so as to be small relative to the rendered document page size. To do so, the digital transmitter device can be configured, manually or otherwise, to have control over the location and size of the water mark on the rendered documents.

Once the document composition process has digitized the scanned object data with the insertion fields as discussed above, the composed documents can be printed out, sent as a facsimile transmission to a facsimile telephone number specified by the user, and/or sent in an attached file to an e-mail message that is transmitted to an e-mail address(es) specified by the user. Moreover, the image composer 217 of memory 206 can provide the digital transmitter device 102 with the capability of performing a variety of document composition routines for a plurality of data formats. These data formats include an American Standard Code for Information Interchange (ASCII) formatted data format, a word processor format, a spread sheet data format, a Portable Document Format (PDF) data format, a slide show software data format such as the Power Point® software data format from Microsoft Corporation of Redmond Wash., USA, a graphic image file format (GIFF) data format, a tagged image file format (TIFF) data format, a Joint Photographic Experts Group (JPEG) data format, a bit-map data format, an optical character recognition (OCR) data format, and/or other forms of encoded data, including, e.g., encrypted data, etc.

When the user enters a command displayed upon touch sensitive menu screen 210 to enter or retrieve an e-mail address, digital transmitter device 102 coordinates the input of the e-mail address. Controller 250 then executes a user message compositing routine which can be stored in memory 206. The user message compositing routine assembles message data. The message data so assembled can include the e-mail address(es) input or otherwise designated by the user, the bit map or other output that is a digital representation of the modified scanned image, and can also include any message text entered by the user upon touch sensitive menu screen 210. The message data is then sent by a wired and/or wireless link from digital transmitter device 102 to interconnected network 104. From interconnected network 104, a communication is established with an e-mail server 106 as seen in FIG. 1. The e-mail server 106 serves the e-mail address to which the e-mail message from digital transmitter device 102 is to be sent. By way of example server 106 can, but need not, function as the e-mail server of any e-mail address of digital transmitter devices 102-i seen in FIG. 1a. Alternatively, a server in communication with interconnected network 104, other than server 106, can be the e-mail server for e-mail addresses associated with digital transmitter devices 102-i.

CPU(s) 202 is configured to perform the operations described above using various executable modules of memory 206. These executable modules of memory 206 can include an e-mail address storage/retrieval routine, a communicative link interface routine, and a user message compositing routine, any of which can each be implemented in software and/or firmware.

In one embodiment of the invention, an e-mail address storage/retrieval routine executing on CPU(s) 202 receives input of an e-mail address from a user at touch sensitive menu screen 210 or retrieves a list of stored e-mail addresses by a look up that makes use of the user's input. The list of e-mail addresses can be displayed on touch sensitive menu screen 210 in a hierarchical list. The list can be sorted alpha-numerically. The user can either select from among the displayed e-mail addresses or input the characters of a specific e-mail address using a 'drill-down' function of the menu, as discussed below with respect to FIGS. 3-4. The drill-down menu format and the displayed list of retrieved e-mail addresses assist the user in locating an e-mail address of interest.

FIG. 2 shows server 106 as being in communication with interconnected network 104 and having a processor 232, a volatile memory 234, and memory 222. Memory 222 includes a device driver 228, a server module 230, optionally the database and file codes storage 224 discussed above, and application routines 226 for storage of software or other machine executable code. Application routines 226 are storage locations for programs that can be executed by processor 232 on server 106.

Figure 3:
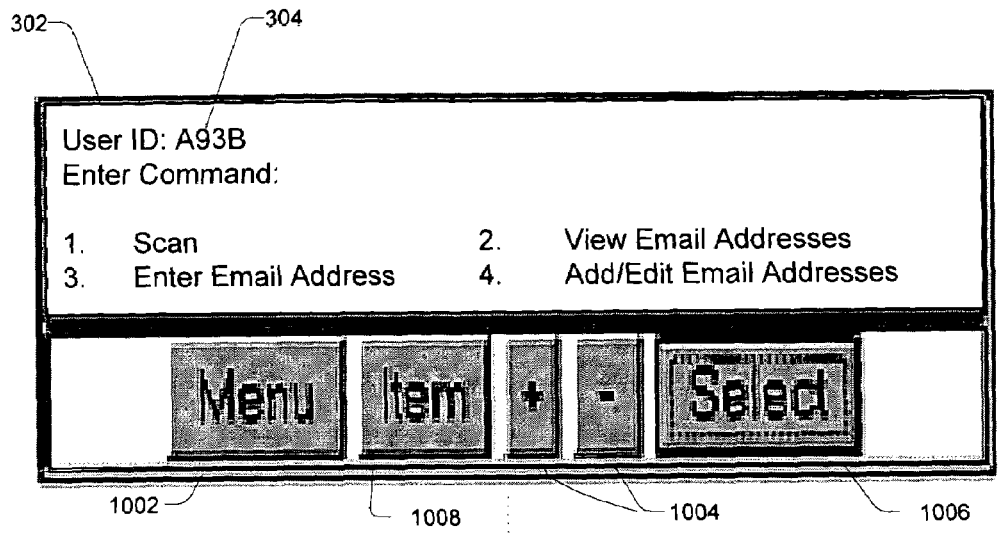
FIGS. 3-4 illustrate an example of sequential menu pages that might be displayed on a touch sensitive menu screen of a digital transmitter device, according to an embodiment of the present invention.
Figure 4:
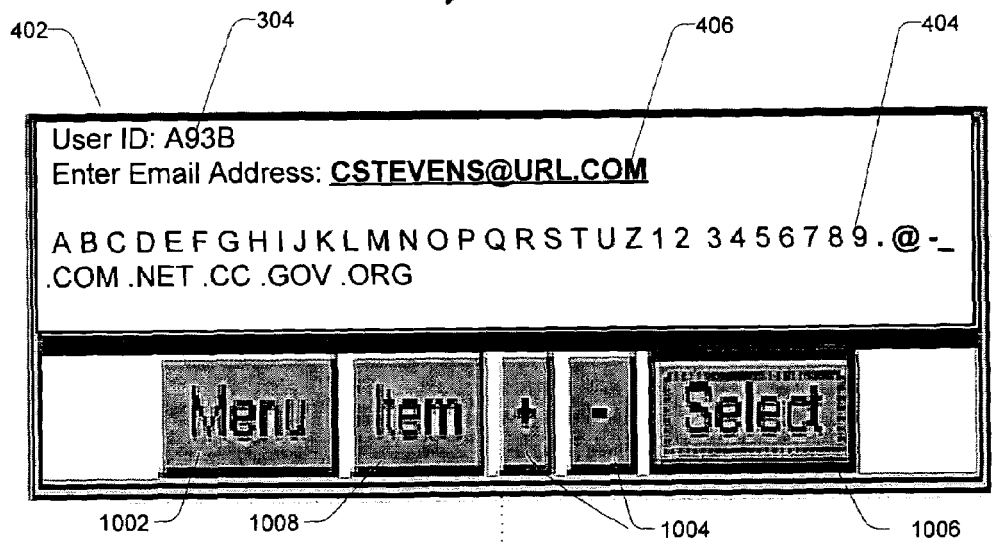
Figure 6:
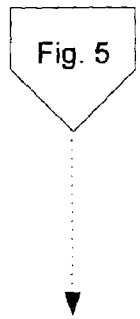
FIG. 6 illustrates an example of a menu page that might be displayed on the touch sensitive menu screen of the digital transmitter device in sequence after a transition from the menu page of FIG. 4, where input to two (2) fields corresponding to the two (2) fields of detectable indicia in FIG. 5 are provided by a user, according to an embodiment of the present invention.
Figure 6:
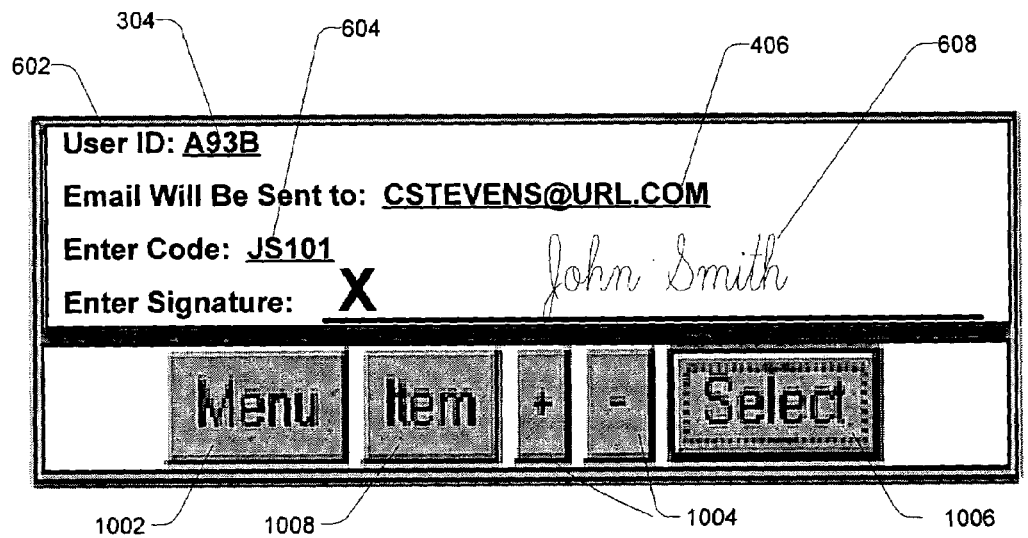

As mentioned in the examples above, a user interface device can be used to accept the input of an e-mail address, insertions to be inserted into insertion fields, and a manually input signature from a user at the digital transmitter device. By way of example, a sequence of menus that can be displayed upon touch sensitive menu screen 210 of digital transmitter device 102 is seen in FIGS. 3, 4 and 6. A menu screen 302 seen in FIG. 3 is displayed upon touch sensitive menu screen 210 of digital transmitter device 102. Menu screen 302 shows various options to be selected by a user of digital transmitting device 102. In the example provided in FIG. 3, a user has already input the character string "A93B" as a User ID at reference numeral 304 on menu screen 302.

When the user selects option "1" on menu screen 302, digital transmitter 102 activates scanning mechanism 212 to scan in documents as discussed above. When the user selected option "3" on menu screen 302, menu screen 402 seen in FIG. 4 is displayed. Menu screen 402 can be used to receive input from the user. The user can directly enter each character of a desired e-mail address using displayed virtual buttons. Menu screen 402 shows a practical example of a user selecting characters for a desired e-mail address. Script code executing in CPU(s) 202 can be used to present menu screen 402. The execution of this script code allows the user to see alphabetic and symbolic characters as the user depresses virtual buttons 1004 so as to move forward and backward through a displayed hierarchical list of available alphabetic and symbolic characters. Script code executes in CPU(s) 202 to enable a user to select a displayed character by depressing virtual button 1006. Output area 406 on menu screen 402 shows that the user has entered various letters and symbols for the e-mail address "CSTEVENS@URL.COM". Then, when the "Select" virtual button 1006 is depressed on touch sensitive menu screen 210, as represented by menu screen 402, the user sees a transition to a menu screen 602 in FIG. 6. Other virtual buttons on the touch sensitive menu screen 210 are also contemplated in order to provide for the initiation of other and/or additional functions by the user, such as a menu virtual item button 1002 seen in FIGS. 3, 4 and 6.

Figure 5:
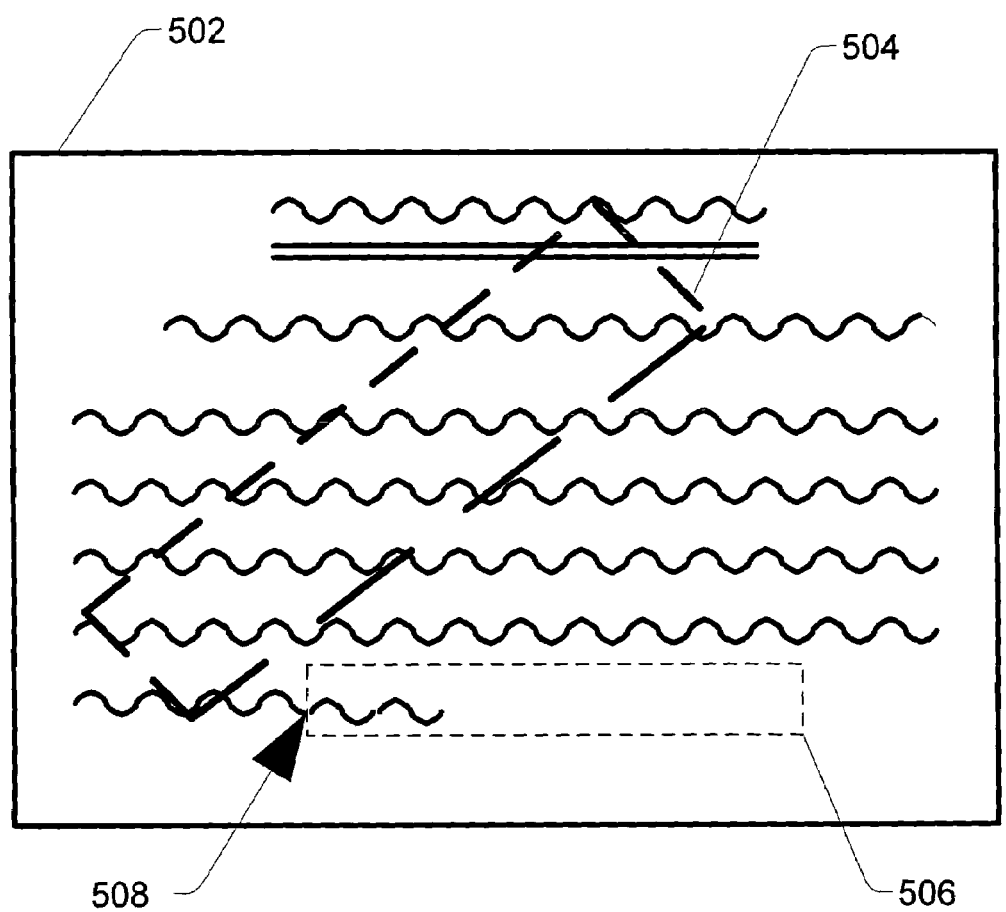
FIG. 5 illustrates an example, according to an embodiment of the present invention, of a paper document to be optically scanned into a scanning mechanism of a digital transmitter device and upon which two (2) fields of detectable indicia are situated.

Before a user places one or more pieces of paper in a sheet feeder to be optically scanned with a scanning mechanism into a digital transmitter device, one such piece of paper 502 can have an image such as is seen in FIG. 5. Of course, the image is not required to be on a piece of paper. Rather, the image can be on a substrate or other image-bearing surface. The image seen on paper 502 has a double underlined heading and has text below the heading. The text below the heading has a font, a case, a line spacing, a text color, a background color, a foreground color, a particular character spacing, certain text effects, an alignment for each line and each paragraph, text shadowing, and text shading. A first detectable indicia 504 and a second detectable indicia 506 are seen in the image on paper 502. As discussed above, such indicia can be any shape or symbol that is detectable by execution of a detection application 216 upon the optically scanned image by digital transmitter 102. As such, the first and second detectable indicia 504, 506 can be, for example, bar codes, invisible ink, visible ink, symbols, hole punch sequences, etc.

Reference numeral 508 points to a portion of the image on paper 502 where second detectable indicia 506 overlaps with text in the image on paper 502. The digital transmitter device 102 can be configured such that an insertion field corresponding to the second detectable indicia 506 will be shifted in the position thereof such that the text on paper 502 will not be obscured by the filling in of the insertion field corresponding to the second detectable indicia 506. As such, none of the text of paper 502 will be cropped or otherwise obscured by inserted text or objects. One routine for performing such a 'no cropping option' is to shift the location of the insertion field corresponding to the second detectable indicia 506 such that the complete periphery around the insertion field is represented only by a white color (e.g., a blank space). This completely white periphery can be detected by detection application 216 in the optically scanned image. Other known routines to avoid obscuring and/or cropping an underlying image with inserted text and objects are also contemplated.

The detection of first and second detectable indicia 504, 506 is interpreted by the execution of detection application 216 as an instruction to display the menu screen 602 seen in FIG. 6. Menu screen 602 displays a prompt for the user to manually enter an alphanumeric address code 604 and a handwritten signature 608. The alphanumeric address code 604 can be entered on touch sensitive menu screen 210 as was the e-mail address seen at 406 in menu screen 402 of in FIG. 4. A handwritten signature 608 can be entered by using a pen or stylus upon touch sensitive menu screen 210. Alternatively, the pen or stylus can also be used to make other inputs to menu screens 302 and 402 on touch sensitive menu screen 210. As can be seen in menu screen 602, the result of the manually entered signature is displayed.

After input is accepted from the user of menu screen 602, the input can be used to look up data and object to be inserted into the two insertion fields that correspond to the first and second detectable indicia 504, 506. The location, size, and shape, and any rule governing the same, can also be looked up for the two insertion fields. These data and objects can be found by look ups in one or both of database and file codes storage 220, 224, respectively, at digital transmitter device 102 and server 106.

Once the text and/or objects are found by the look ups, they can be inserted, fitted into, or otherwise superimposed into/ onto the size and shape of each of the two insertion fields by execution of the image composer 217 and/or the detection application 216. An example of a resultant modified scanned image is seen in FIG. 7. The modified scanned image shows a superimposed watermark handwritten signature 702 that has been substituted for the insertion field corresponding to first detectable indicia 504. The superimposed watermark handwritten signature 702 reflects the handwritten signature 608 that was input to menu screen 602. A look up was performed on the alphanumeric address code 604 entered in menu screen 602 to obtain the address data 704 that is seen inserted into an insertion field corresponding to the second detectable indicia 506. A 'no cropping' option has been used in the resultant modified scanned image in that the address data 704 is shifted to the right so as to avoid obscuring text in the image on the paper proximal to the reference numeral 706 in FIG. 7.

The modified scanned image seen in FIG. 7 can be printed out, sent to the displayed facsimile telephone number 555-123-4321 for rendering, and/or made into a document (e.g., a "*.PDF" file) that can be attached to an e-mail message addressed to the e-mail address "CSTEVENS@URL.COM." In transmitting an e-mail message after the foregoing input sequence from a user, digital transmitter device 102 can use the execution of image composer 217 to compose all insertion fields with the scanned document(s) and then assemble message data to be sent in an e-mail message through interconnecting network 104 to the e-mail address(es) that was/were selected or otherwise entered by the user, as discussed above.

Before a user places one or more pieces of paper in a sheet feeder to be optically scanned with a scanning mechanism into a digital transmitter device, one or more such pieces of paper can have an image, an example of which has been discussed above with respect to FIG. 5. After the document composition is performed by the digital transmitter device 102, each rendered page can have a representation such as has been discussed with respect to FIG. 7 where a manually entered signature has been superimposed with an address and facsimile number also inserted into the image.

Whether one or all of the rendered pages are to show the handwritten superimposed entries can be an option that is left to the user who is placing the detectable indicia. Alternatively, the routines controlling the corresponding insertion fields with respect to the placement and appearance of the insertions upon the rendered page can control whether or not one or all of the rendered pages are to show the handwritten superimposed entries. By way of example, if the document composition process produces a PDF file from scanned documents, a user that opens the PDF file with a PDF reader might see the handwriting superimposed on the rendering on all of the pages of the document in the PDF file. Other data can be superimposed by the document composition component of the digital transmitter device, such as the time, date, e-mail address of the sender, etc. Of course, data formats other than PDF, as discussed above, can be used by the image composer.

Exemplary Embodiments of Digital Transmitter Device Capture of Substitutions for Detectable Indicia and Distribution thereof FIG. 8 shows a flow diagram, according to an embodiment of the present invention, depicting a method for using a digital transmitter device. With this in mind, CPU(s) 202 can be configured to perform the operations described below. By way of further example, the flow diagram is depicted in FIG. 8 to illustrate certain exemplary functions that can be performed using CPU(s) 202 and the other resources in digital transmitter device 102. Here, a process 800 is provided.

FIG. 8 shows a flow diagram according to an embodiment of the present invention, and depicts a method for using digital transmitter device 102. With this in mind, CPU(s) 202 can be configured to perform the operations described below. By way of further example, the flow diagram depicted in FIG. 8 illustrates certain exemplary functions that can be performed using CPU(s) 202 and the other resources in digital transmitter device 102. Here, a process 800 is provided.

FIG. 8 shows process 800 beginning at block 802 which directs a process flow to block 804. At block 804, process 800 waits for the scanning mechanism 212 of the digital transmitter device 102 to be ready to perform a scanning operation. When the scanning mechanism 212 is ready, the process 800 moves control to block 806. At block 806, a prompt is displayed requesting user input. The displayed prompt can request an input of a User ID. The displayed prompt can also request the input of a form code, where the form code will indicate a certain type of form that is to be scanned in or will indicate certain fields that are included in a corresponding form. The displayed prompt can also request the input of one or more e-mail addresses and/or the input of a typed text message that is to be entered at a user interface (e.g., a keyboard). The displayed prompt can also request that the user provide input via a handwriting, such as at a touch sensitive menu screen.

After block 806, the user's input is received and a query is conducted at block 808 that validates the input. The validity test can be directed, for instance, towards compliance with expected input to corresponding insertion fields that correspond to a forms code that was input at block 806. If the input is invalid, process 800 returns to block 806. Otherwise, process 800 moves to block 810 where an optional access control check is performed. If access is granted, such as via a check of the User ID entered at block 806, the process 800 moves to block 814. Otherwise, process 800 displays a representative diagnostic at block 812 and then returns to block 804. Once access has been granted at block 810, block 814 uses the input in order to access a database and/or to retrieve data. The various acceptable inputs made by the user at block 806 can be used to access one or more databases so as to retrieve corresponding data, such as insertions that are to be made into a form that corresponds to a form code that was input at block 806. The retrieved data can be, for instance, the size, shape and characteristics of insertion fields that correspond to detectable indicia that is expected to be detected at block 817, below, in accordance with a form code input by the user at block 806. Other data that can be retrieved can include one or more e-mail addresses in a distribution list and/or an optional text message to be sent with an e-mail message. By way of example and not by way of limitation, database and file codes storage 220, 224, respectively at the digital transmitter device 102 and at the server 106, can be used to retrieve these data.

At block 816, scanning mechanism 212 scans in a document for storage at the digital transmitter device 102 as an optically scanned image of the document. Block 817 calls for the execution of detection application 216 to locate detectable indicia in the optically scanned image of the document. When an insufficient detection results, process 800 optionally displays corresponding diagnostics at block 812 and returns to block 804. When detectable indicia is located in the optically scanned image, process 800 moves to block 818.

Optionally, after block 817, another prompt can be displayed to the user upon touch sensitive menu screen 210 of the digital transmitter device 102. This prompt can request that the user provide input for each of one or more insertion fields that respectively correspond to the detectable indicia found at block 817. Alternatively, this input could have been provided by the user at block 806 in response to a form code that was input by the user.

Process 800 passes control to block 818 after it has been determined at block 817 that detectable indicia was detected. At block 818, process 800 waits for the image composer 217 of the digital transmitter device 102 to be ready to perform a image compositing routine. The purpose of the image compositing routine is to compose a modified scanned image of the document. Once the image composer 217 is ready, process 800 moves to block 820.

At block 820, insertions are made into and/or superimpositions are made over in the optically scanned image of the original document. These insertions and superimpositions, which can be text, symbols, and/or handwriting, correspond to the locations in the optically scanned image of the document that correspond to one or more insertion fields. The insertion fields, in turn, correspond to one or more detectable indicia that was detected at block 817. These insertions and superimpositions can be performed by the image composer component 217 of digital transmitter device 102 which can be executed, in conjunction with scanning mechanism 212, to maintain data and/or algorithms, software, firmware, or other process control means for composing documents with the corresponding insertion fields in the optically scanned documents. Thus, the arrival of process 800 at block 820 can initiate the execution of image composer component 217 and/or detection application 216 of the digital transmitter device 102 so as to insert and/or superimpose text, symbols, and/or handwriting into insertion fields corresponding to the detectable indicia that were detected by the execution of detection application 216.

In an optional routine, at block 822, the digital transmitter device 102 can be configured to permit or prevent one or more specific insertion fields from cropping or clipping the underlying portion of the optically scanned document, as disclosed above (e.g., the 'no clipping' option). As a further option, at block 822, the size and/or shape of the retrieved text and/or objects and their corresponding insertion fields can be adjusted to fit one another within the given size and shape of the optically scanned document (e.g., a 'fit-to-form' routine).

Another optional routine at block 822 is to perform optical character recognition (OCR). The OCR is followed by the performance of an automatic word processing application to insert each of the text and/or objects that are to be inserted into the respective insertion fields within the document. As such, any text that is to be inserted into an insertion field can be made to match the font and general appearance of the text of the scanned document as determined after the OCR operation. By way of example, and not by way of limitation, the document of FIG. 5 can be subjected to an OCR operation to determine the text characteristics of the document. Then, the inserted text field 704 seen in FIG. 7 can be made to match the determined text characteristics. Alternatively, the digital transmitter device can be configured such that all or a portion of the document can be adjusted to different text characteristics so that the inserted text or objects appear to match or esthetically fit in within the document. Various procedures can be adopted so that the document and/or the inserted text or objects can be modified. For instance, following, the optically scanning and an OCR operation, the optically scanned document can be formed into an editable document. One or more locations in the document are identified that correspond to the locations of the detectable indicia. One or more textual characteristics of the document are identified for all or a portion of the document such as for the text that is adjacent to the location of each of the detectable indicia. The insertions of text or objects are then made into the editable document. The editable document can then be transformed into a digital image thereof. The one or more textual characteristics can be one or more of the following: font, case, line spacing, text color, background color, foreground color, character spacing, text effects, alignment, shadowing, and shading.

When the insertions in the insertion fields cause the resultant document to exceed its original number of pages or sectional delimiters, the digital transmitter device can be configured to deal in known ways corresponding to any reflow optimization at optional block 822.

After block 822, process 800 performs block 824 through the execution of the image composer 217 by digital transmitter device 102 that composes the document with the insertion fields filled in and with any superimpositions made, thereby producing a digital rendering of the document that was scanned at block 816. At block 826, the digital rendering can be output by printing, facsimile transmission, or by one or more e-mail messages that are assembled and transmitted to the e-mail address(es) input or otherwise specified by the user at block 806. A file containing the digital rendering of the document can be attached to each e-mail message that is to be transmitted. After the block 826, process 800 returns to block 804 to repeat the foregoing procedure.

The foregoing Detailed Description has set forth an example of transmitting an e-mail message from a digital transmitter device. Embodiments of the present invention contemplate other types of data that can also be addressed and transmitted from a digital transmitter device to an electronic address, including those now known and those yet to be developed. As such, and in addition to an e-mail transmission, embodiments of the present invention include a transmission from a digital transmitter device to an electronic address that includes an address of a network resource on a network and a destination location thereat. By of example, and not by way of limitation, the electronic address can be a file folder address at a server on a network and can also be a Web site address at a server on a network. Additionally, by way of example the modified image could also be stored on the hard drive of the digital transmitting device.

Although some implementations of the present invention have been illustrated in the accompanying Drawings and described in the foregoing Detailed Description, it will be understood that the present invention is not limited to the exemplary implementations disclosed, but is capable of numerous rearrangements, modifications and substitutions without departing from the spirit of the invention as set forth and defined by the following claims.

What is claimed is:

1. A computer-readable medium having computer-executable instructions which, when executed on one or more processors of a digital transmitter device, direct the digital transmitter device to perform a method comprising:
    composing a digital image from an optically scanned image at the digital transmitter device;
    detecting predetermined indicia in the digital image;
    substituting an object for the detected predetermined indicia in the digital image; and
    outputting a rendering of the digital image.

2. The computer-readable medium as defined in claim 1, wherein the composing further comprises transforming optically scanned images of one or more sheets of paper into the digital image, wherein one or more sheets of paper were received from a sheet feeder at a scanning mechanism of the digital transmitter device.

3. The computer-readable medium as defined in claim 1, wherein the detecting further comprises locating a portion of the digital image corresponding to predetermined indicia, wherein the portion exhibits a predetermined range of reflectance values.

4. The computer-readable medium as defined in claim 3, wherein the predetermined range of reflectance values is detectable at the portion when the portion is illuminated by light having a predetermined range of wavelengths.

5. The computer-readable medium as defined in claim 4, wherein the predetermined range of wavelengths represents a blue-violet light.

6. The computer-readable medium as defined in claim 3, wherein the predetermined range of reflectance values is invisible to the human eye in natural sunlight.

7. The computer-readable medium as defined in claim 1, wherein the detecting further comprises:
    locating a portion of the digital image corresponding to predetermined indicia, wherein the portion includes a bar code.

8. The computer-readable medium as defined in claim 7, wherein the bar code has a value corresponding to the object to be substituted.

9. The computer-readable medium as defined in claim 1, wherein:
    the detecting predetermined indicia in the digital image further comprises detecting a symbol corresponding to the predetermined indicia in the digital image; and
    the symbol represents the object to be substituted.

10. The computer-readable medium as defined in claim 1, wherein the substituting further comprises:
    determining a value for the detected predetermined indicia; and
    looking up the determined value in a table of values having objects respectively corresponding thereto in order to determine the object to be substituted.

11. The computer-readable medium as defined in claim 1, wherein the object to be substituted has a predetermined size and shape.

12. The computer-readable medium as defined in claim 11, wherein the predetermined size and shape has a perimeter selected from the group consisting of a substantially rectangular perimeter and a substantially arcuate perimeter.

13. The computer-readable medium as defined in claim 1, wherein:
    the predetermined indicia are detected in the digital image at a portion thereof having a perimeter;
    the object to be substituted has a predetermined size and shape; and
    the substituting further comprises:
    changing the predetermined size and shape of the object to be substituted into a size and shape not larger than the perimeter of the portion of the detected predetermined indicia; and
    substituting the changed predetermined size and shape of the object for the detected predetermined indicia in the digital image.

14. The computer-readable medium as defined in claim 1, wherein:
    the predetermined indicia is detected in the digital image at an indicia portion thereof; and
    the substituting further comprises:
    determining whether the indicia portion intersects any non-blank region of the digital image; and
    situating the object in the digital image such that the object does not intersect a non-blank region of the digital image.

15. The computer-readable medium as defined in claim 1, wherein the substituting further comprises:
    receiving input corresponding to the detected predetermined indicia in the digital image; and
    forming the input into the object to be substituted in the digital image.

16. The computer-readable medium as defined in claim 15, wherein the forming the input further comprises looking up the received input to determine the object to be substituted in the digital image that corresponds to the received input.

17. The computer-readable medium as defined in claim 16, wherein the receiving input further comprises receiving a handwriting image at a touch sensitive input device of the digital transmitter device.

18. The computer-readable medium as defined in claim 16, wherein the outputting a rendering of the digital image further comprises transmitting a network message including the digital image from the digital transmitter device to an electronic address including an address of a network resource and a destination location thereat.

19. The computer-readable medium as defined in claim 1, wherein the substituting further comprises receiving a handwriting image at a touch sensitive input device of the digital transmitter device corresponding to the detected predetermined indicia in the digital image.

20. The computer-readable medium as defined in claim 19, wherein the rendering of the digital image comprises the handwriting image superimposed over the optically scanned image.

21. The computer-readable medium as defined in claim 20, wherein the handwriting image in the rendering of the digital image does not obscure any portion of the optically scanned image.

22. The computer-readable medium as defined in claim 1, wherein:
the substituting Thither comprises receiving input of an electronic address; and
the outputting a rendering of the digital image further comprises fanning a transmission for transmitting a network message including the digital image from the digital transmitter device to the electronic address including an address of a network resource and a destination location thereat.

23. The computer-readable medium as defined in claim 1, wherein the rendering of the digital image is selected from the group consisting of a print out, a facsimile transmission of the digital image, an e-mail message containing a representation of the digital file, and an e-mail message having a file attached thereto that contains a representation of the digital file.

24. The computer-readable medium as defined in claim 23, wherein the attached file has a format selected from the group consisting of an ASCII formatted data format, a word processor format, a spread sheet data format, a PDF data format, a slide show software data format, a GIFF data format, a TIFF data format, a JPEG data format, a bit-map data format, an OCR data format, and an encoded data format.

25. The computer-readable medium as defined in claim 23, wherein the e-mail message has an associated electronic address selected from the group consisting of:
an electronic mail (e-mail) address at an e-mail server on a network;
a file folder address at a server on a network; and
a Web site address at a server on a network.

26. The computer-readable medium as defined in claim 1, wherein:
the substituting further comprises:
receiving input corresponding to the detected predetermined indicia in the digital image, wherein the input is received at a touch sensitive input device of the digital transmitter device and comprises a handwriting image; and
forming the handwriting image into the object to be substituted in the digital image;
the outputting further comprises transmitting a network message including the digital image from the digital transmitter device to an electronic address including an address of a network resource and a destination location thereat.

27. The computer-readable medium as defined in claim 1, wherein the digital transmitter device is selected from the group consisting of a facsimile machine, a copier, a multi-function peripheral (MFP), and a digital network copier.

28. A digital transmitter device comprising:
user interface means for entering input data;
means for composing a digital image from an optically scanned image;
means for detecting predetermined indicia in the digital image;
means for substituting an object for the detected predetermined indicia in the digital image; and
means for outputting a rendering of the digital image.

29. The digital transmitter device as defined in claim 28, further comprising:
means for storing a lookup database;
means for looking up manual input received at the means for making input against the lookup database;
means, when the means for looking up locates the manual input in the lookup database, for making the object to be the manual input; and
means, when the means for looking up does not locate the manual input in the lookup database, for making the object to be a diagnostic reflecting the absence of validation of the manual input.

30. The digital transmitter device as defined in claim 29, wherein the means for making the object to be the manual input further comprises means for forming a transmission message to be transmitted over an interconnected network to an electronic mail address.

31. The digital transmitter device as defined in claim 28, wherein the means for detecting further comprises means for locating a portion of the digital image corresponding to predetermined indicia, wherein the portion exhibits a predetermined range of reflectance values that are detected by the means for detecting.

32. The digital transmitter device as defined in claim 31, wherein the predetermined range of reflectance values is detectable at the portion when the portion is illuminated by light having a predetermined range of wavelengths.

33. The digital transmitter device as defined in claim 28, wherein means for the detecting further comprises means for locating a portion of the digital image corresponding to predetermined indicia, wherein the portion includes a bar code.

34. The digital transmitter device as defined in claim 33, further comprising:
means for determining a value corresponding to the bar code; and
means for looking up the value to identify the object to be substituted.

35. The digital transmitter device as defined in claim 28, wherein the means for substituting further comprises means for receiving a handwriting image at a touch sensitive input device of the digital transmitter device corresponding to the detected predetermined indicia in the digital image.

36. The digital transmitter device as defined in claim 35, wherein the rendering of the digital image comprises the handwriting image superimposed over the optically scanned image.

37. The digital transmitter device as defined in claim 36, wherein the handwriting image in the rendering of the digital image does not obscure any portion of the optically scanned image.

38. The digital transmitter device as defined in claim 37, wherein the handwriting image in the rendering of the digital image is sized so as to avoid obscuring any portion of the optically scanned image.

39. A digital transmitter device comprising:
a user interface having a screen for displaying diagnostics and an input mechanism to receiving input;
an optical scanner to optically scan one or more images;
one or more processors executing an application to:
compose corresponding one or more digital images from the optically scanned one or more images;
detect one or more portions within the one or more digital images that contain predetermined indicia;
identify, for each detected said predetermined indicia, a corresponding object;
determine which of the identified said objects are to be completed by:
receiving input data through the input mechanism; and
looking up the identified said objects;
prompt and receive an input object at the user interface for each said object to be completed by the received input data;

look up a value object for each said object to be completed by look up; and substitute each said input object and value object for the respective portion within the one or more digital images that contains the predetermined indicia;

an output device to output a rendering of the one or more digital images.

40. A method comprising:

forming an optically scanned image at a digital transmitter device of media bearing predetermined indicia;

composing, at a digital transmitter device, a digital image from the optically scanned image;

detecting, with the digital transmitter device, a portion of the optically scanned image at which the predetermined indicia is situated;

identifying, with the digital transmitter device, an object corresponding to the predetermined indicia;

substituting, with the digital transmitter device, the object into the digital image at the portion; and outputting, at the digital transmitter device, a rendering of the digital image selected from the group consisting of a print out, a facsimile transmission, and an e-mail message.

41. The method as defined in claim 40, wherein:

the detecting predetermined indicia in the digital image further comprises detecting a symbol corresponding to the predetermined indicia in the digital image; and the symbol represents the object to be substituted.

42. The method as defined in claim 40, wherein the substituting further comprises:

determining a value for the detected predetermined indicia; and looking up the determined value in a table of values having objects respectively corresponding thereto in order to determine the object to be substituted.

43. The method as defined in claim 40, wherein:

the predetermined indicia are detected in the digital image at a portion thereof having a perimeter;

the object to be substituted has a predetermined size and shape; and the substituting further comprises:

changing the predetermined size and shape of the object to be substituted into a size and shape not larger than the perimeter of the portion of the detected predetermined indicia; and substituting the changed predetermined size and shape of the object for the detected predetermined indicia in the digital image.

44. The method as defined in claim 40, wherein the substituting further comprises receiving a handwriting image at a touch sensitive input device of the digital transmitter device corresponding to the detected predetermined indicia in the digital image.

45. The method as defined in claim 44, wherein the rendering of the digital image comprises the handwriting image superimposed over the optically scanned image.

46. The method as defined in claim 45, wherein the handwriting image in the rendering of the digital image does not obscure any portion of the optically scanned image.

47. A computer-readable media comprising instructions that, when executed a digital transmitter device, perform a method that includes:

forming an optically scanned image at a digital transmitter device of media bearing predetermined indicia;

composing, at the digital transmitter device, a digital image from the optically scanned image;

detecting, with the digital transmitter device, a portion of the optically scanned image at which the predetermined indicia is situated;

identifying, with the digital transmitter device, an object corresponding to the predetermined indicia;

substituting, with the digital transmitter device, the object into the digital image at the portion; and outputting, at the digital transmitter device, a rendering of the digital image selected from the group consisting of a print out, a facsimile transmission and an e-mail message.

* * * * *

UNITED STATES PATENT AND TRADEMARK OFFICE
CERTIFICATE OF CORRECTION

PATENT NO. : 7,457,464 B2 Page 1 of 1
APPLICATION NO. : 10/652006
DATED : November 25, 2008
INVENTOR(S) : Chad A. Stevens et al.

It is certified that error appears in the above-identified patent and that said Letters Patent is hereby corrected as shown below:

In column 19, line 7, in Claim 22, delete "Thither" and insert -- further --, therefor.

In column 19, line 10, in Claim 22, delete "fanning" and insert -- forming --, therefor.

In column 22, line 37, in Claim 47, delete "transmission" and insert -- transmission, --, therefor.

Signed and Sealed this

Eleventh Day of August, 2009

David J. Kappos
*Director of the United States Patent and Trademark Office*